United States Patent [19]

Soeda et al.

[11] Patent Number: 4,710,022
[45] Date of Patent: Dec. 1, 1987

[54] METHOD AND APPARATUS FOR MEASURING CHROMATIC DISPERSION COEFFICIENT

[75] Inventors: Kazuhiko Soeda, Yokohama; Masakazu Mori, Kawasaki; Tsutomu Nishikawa, Yokohama; Kiyoshi Tomimori, Kawasaki, all of Japan

[73] Assignee: Fujitsu Limited, Kawasaki, Japan

[21] Appl. No.: 654,158

[22] Filed: Sep. 25, 1984

[30] Foreign Application Priority Data

Oct. 31, 1983 [JP] Japan .................. 58-202706

[51] Int. Cl.⁴ .......................................... G01N 21/84
[52] U.S. Cl. ...................................... 356/73.1
[58] Field of Search ........................ 356/73.1

[56] References Cited
PUBLICATIONS

Daikoku et al, "Direct Measurement of Wavelength Dispersion in Optical Fibres-Difference Method", Electronics Letters, 2nd Mar. 1978, vol. 14, #5, pp. 149-151.

Primary Examiner—Vincent P. McGraw
Attorney, Agent, or Firm—Staas & Halsey

[57] ABSTRACT

A measuring system operated by an optical transmitter; an optical spectrum analyzing part receiving an input optical signal branched from the optical transmitter; an optical receiver for connecting with, via an optical fiber to be measured, the optical transmitter; and a data processing part operative to produce a chromatic dispersion coefficient to be measured, by comparing a calculated baseband characteristic, derived from data concerning the optical transmitter and the optical spectrum analyzing part, with an actual baseband characteristic obtained in the optical receiver.

19 Claims, 17 Drawing Figures 1.289 μm

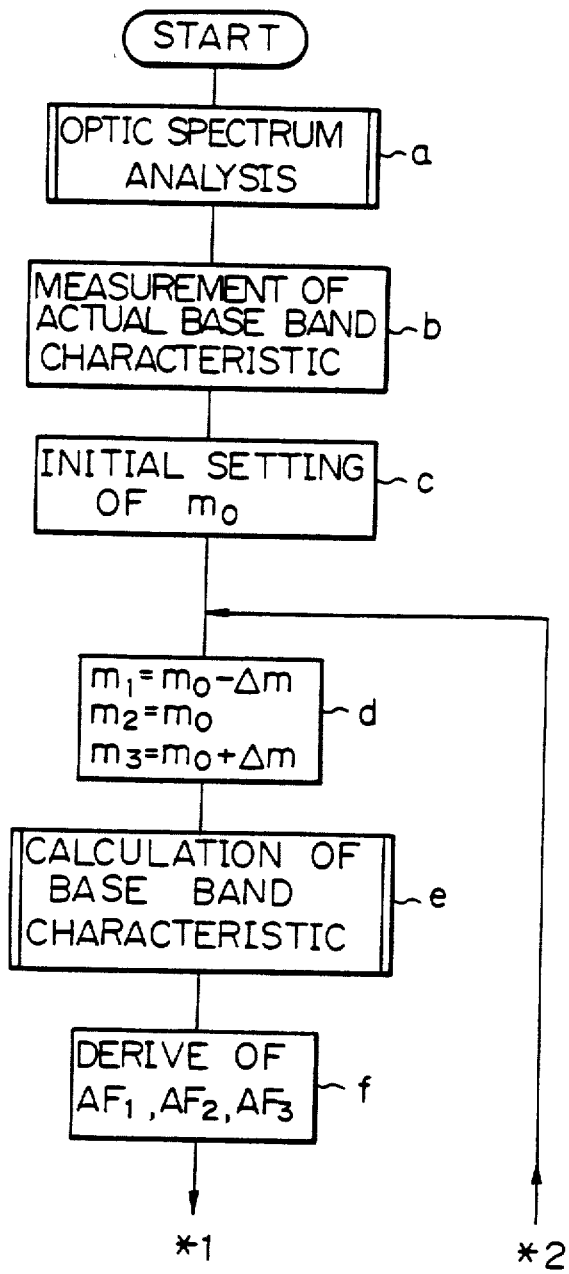

METHOD AND APPARATUS FOR MEASURING CHROMATIC DISPERSION COEFFICIENT

BACKGROUND OF THE INVENTION

The present invention relates to a method and apparatus for measuring the chromatic dispersion coefficient, particularly that of an optical fiber.

Advances in performance of optical fibers have led to the realization of actual long-distance fiber optical communication systems. A fiber optical communication system, particularly one using a single mode optical fiber for the optical transmission line, has the advantage of extremely small expansion of the pulse width during transmission of the pulses from the transmitter side to the receiver side. Accordingly, such a system is suitable for the transmission of high frequency data, i.e., large amounts of data. With a transmitter using a semiconductor laser as a light source, however, the emission spectrum distribution may be considerably wide and jitter of the pulses may occur. In such a case, with a transmission distance over 50 km, reliable data transmission at a high transmission speed of over 400 Mb/s cannot be ensured since both the expansion of the pulse width and variations in the optical pulses, caused by so-called "chromatic dispersion", reach non-negligible levels. That is, inter-symbol interference and mode dispersion noise increase significantly.

"Chromatic dispersion" specifically refers to the dispersion of the optical pulse distribution at the receiver side and is caused by the inevitable differences in arrival times of various optical pulses at the receiver side in accordance with their respective wavelengths $\lambda_1$, $\lambda_2$, $\lambda_3$ and so on. For example, when a semiconductor laser is used as the light source, three or four wavelengths of light are generated therefrom.

In view of the above, it is very important in the design and construction of a fiber optical communication system to determine the degree of chromatic dispersion of the optical fiber, i.e., the chromatic dispersion coefficient. The chromatic dispersion coefficient determines the quality of the optical fiber transmission line and is used as a standard to determine the data transmission capability.

Various types of systems for measuring the chromatic dispersion coefficient are known, for example, a measuring system utilizing the Raman effect and a measuring system operated under a frequency sweep method. Each of the prior art measuring systems have their own shortcomings, however.

SUMMARY OF THE INVENTION

It is an object of the present invention to provide a method and apparatus for measuring the chromatic dispersion coefficient without the shortcomings of the prior art measuring systems.

The above object is attained by a measuring system using an optical transmitter, an optical spectrum analyzing part receiving an input optical signal branched from the optical transmitter, an optical receiver for connecting with the optical transmitter via an optical fiber to be measured, and a data processing part operative to produce a chromatic dispersion coefficient to be measured. The method involves comparing a calculated baseband characteristic, derived from data from the optical transmitter and the optical spectrum analyzing part, with an actual baseband characteristic obtained in the optical receiver.

BRIEF DESCRIPTION OF THE DRAWINGS

The present invention will be more apparent from the ensuing description with reference to the accompanying drawings, wherein:

FIGS. 13A and 13B show a flow chart of the operation achieved in the chromatic dispersion coefficient measuring apparatus shown in FIG. 10.

DESCRIPTION OF THE PREFERRED EMBODIMENTS

Before describing the preferred embodiments, a discussion is presented of the prior art measuring system for reference purposes.

The chromatic dispersion coefficient M may be generally expressed by the following equation:

$$M = \frac{\Delta \tau}{\Delta \lambda \times L} \quad (1)$$

where L denotes a length in km of an optical fiber transmission line, $\Delta \lambda$ the difference between wavelengths in mm, corresponding to the aforesaid differences in wavelengths, i.e., $|\lambda_1-\lambda_2|$, $|\lambda_2-\lambda_3|$, and so on, and $\Delta\tau$ the difference in arrival times in ps at the receiver side between each pair of signals having the respective different wavelengths. The unit of M is ps/km/nm. That is, M specifies the arrival time delay $\Delta\tau$ (ps) that would be included per 1 km of the transmission line if the wavelength $\lambda$ deviates by 1 nm.

Figure 1:
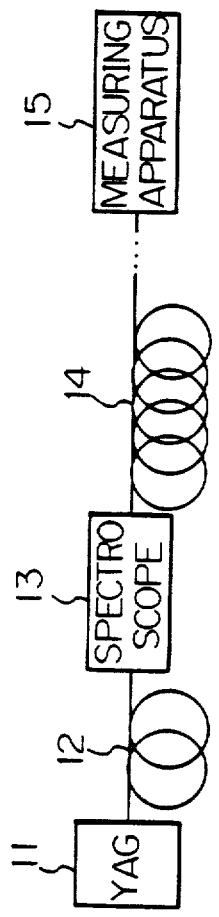
FIG. 1 is a general view of an example of a prior art apparatus for measuring the chromatic dispersion coefficient.

FIG. 1 is a general view of an example of a prior art apparatus for measuring the chromatic dispersion coefficient. In FIG. 1, reference numeral 14 indicates an optical fiber to be measured for the chromatic dispersion coefficient. At the optical input side of the optical fiber 14, an yttrium aluminum garnet (YAG) laser source 11, a short optical fiber 12, and a spectroscope 13 are located. At the optical output side thereof, a measuring apparatus 15 is located. Both the YAG laser source 11 and the optical fiber 12 form, as one body, a fiber Raman laser utilizing the Raman effect, where oscillations of various frequencies take place with the wavelengths of $\lambda_1$, $\lambda_2$, $\lambda_3$, and so on. Then, light beams having these various wavelengths are selected one by one by means of the spectroscope 13, so that an arrival time $t_1$ for the light of $\lambda_1$, an arrival time $t_2$ for the light of $\lambda_2$, and so on are sequentially obtained by means of the measuring apparatus 15. Thus, $\Delta\tau$ and $\Delta\lambda$ for defining the above recited equation (1) are actually measured, and then the chromatic dispersion coefficient M can be obtained with the known value of L.

The measuring system of FIG. 1 has the serious shortcoming that it is almost impossible to measure the coefficient when the optical fiber 14 is actually laid. First, it is essential to maintain synchronization between the sending time of the light from the spectroscope 13 and the measuring time for the sent light at the measuring apparatus 15. Accordingly, both ends of the optical fiber 14 must be located close to each other, preferably at the same time. This means the measurement is only effective for inspections of the manufactured optical fiber before shipment from the factory. Second, the fiber Raman laser system (11, 12, 13) is too heavy for operators to carry.

Because the coefficient M measured in a pre-shipment inspection differs from that measured in the field, it is meaningless to find the coefficient M in the factory. The difference between the coefficient M measured in the factory and the field results from the difference in stresses applied to the optical fiber laid in the factory and installed the field, and in the difference in the arrangements of the optical fiber laid in the factory and installed the field.

In another prior art measuring system based on the Raman effect, two light sources having different wavelengths are used and the difference in arrival times between the two corresponding optical signals is obtained by measuring the difference in phase therebetween. It is clear that a single light source is preferable for the measurement in view of cost and easy setting of the measuring system.

Another prior art measuring apparatus utilizes the frequency sweep method. There are two types of this apparatus. The first type assumes that the light source spectrum exhibits a so-called Gaussian distribution. In the system, the following well known equation is used for deriving M:

$$M = \frac{0.442}{f_{6dB}\Delta\lambda_{\frac{1}{2}}L} \qquad (2)$$

where, $f_{6\ dB}$ denotes a modulation frequency at which the value of the baseband characteristic is reduced by 6 dB, and $\Delta\lambda_{\frac{1}{2}}$ denotes the wavelength pitch in the light source spectrum for which the amplitude of the light is halved with respect to the amplitude observed at the center of the Gaussian distribution, i.e., the half width of the spectrum.

This first type of apparatus, however, has the shortcoming of a relatively large error in the measured M. This error is caused by the fact that the spectrum of light from a semiconductor laser does not actually exhibit a Gaussian distribution.

The second type of apparatus takes note of the fact that modulation frequencies at which the attenuation reaches almost 0 dB occur periodically, and derives M by the following equation:

$$M = \frac{1}{f_T \delta L} = \frac{1}{f_t \delta_\lambda L} \qquad (3)$$

where $f_T$ denotes the frequency at which the attenuation again reaches almost 0 dB in the high frequency range, and $\delta_\lambda$ the oscillation mode interval (corresponding to the difference in wavelength between two adjacent line spectra) with which the line spectra periodically appear.

The second type of apparatus, however, has the shortcoming of requiring a very expensive, special measuring instrument which can respond to signals having a high frequency, defined previously as $f_T$.

Figure 2:
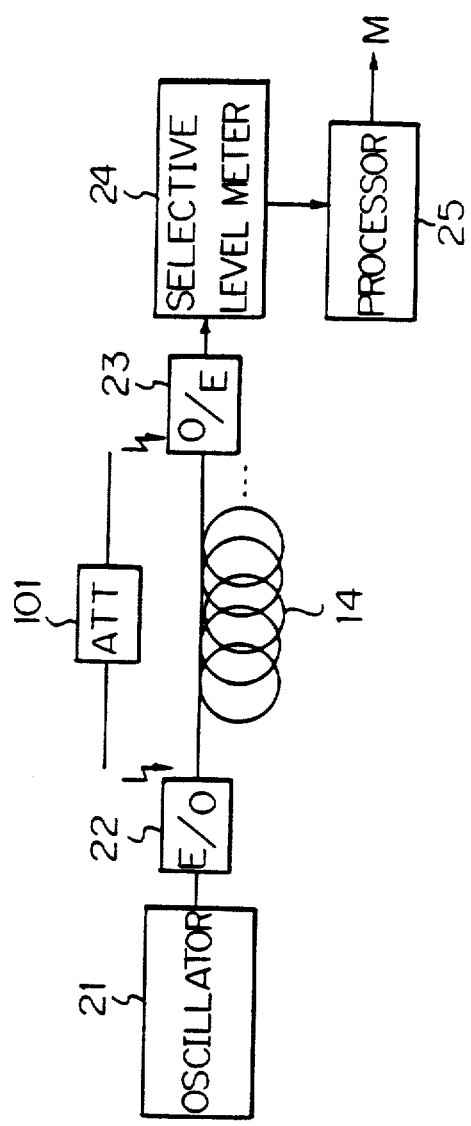
FIG. 2 is a general view of an example of an apparatus for measuring the chromatic dispersion coefficient according to the present invention.

FIG. 2 is a general view of an example of an apparatus for measuring the chromatic dispersion coefficient according to the present invention. In FIG. 2, an oscillator 21 and a selective level meter 24 are connected, via an electro-optic converter (E/O) 22 and an opto-electric converter (O/E) 23, to the ends of the optical fiber 14 to be measured. The oscillator 21 produces an AC signal, such as a sine wave signal, with a variable frequency f. The AC signal modulates the optical output in the E/O 22, which is made of, for example, a semiconductor laser.

Now, the term "baseband characteristic" is generally defined as an amplitude response characteristic of received light with respect to a variation of the modulation frequency f, which received light is measured at the optical output side of the optical fiber 14 when an optical signal, which is the transmitted light from the semiconductor laser as directly modulated in amplitude by the oscillator 21, is input to the optical input side of the optical fiber 14. To be more specific, for an optical fiber having a vector $\dot{P}_{in}(t)$ as an input and a vector $\dot{P}_{out}(t)$ as an output thereof, these vectors can be expressed as follows:

$$\dot{P}_{in}(t) = \dot{P}_{in}e^{j\omega t} \qquad (4)$$

$$\dot{P}_{out}(t) = \dot{P}_{out}e^{j\omega t} \qquad (5)$$

where $\omega$ denotes angular frequency. Since the signal $\dot{P}_{in}(t)$ is input to the optical fiber with the angular frequency $\omega$ and the signal $\dot{P}_{out}(t)$ is output therefrom, a transfer function $\dot{H}(t)$ of the optical fiber can be expressed, in terms of the above equations (4) and (5), as follows:

$$\dot{H}(t) = \frac{\dot{P}_{out(t)}}{\dot{P}_{in(t)}} = \frac{\dot{P}_{out}}{\dot{P}_{in}} \quad (6)$$

Thus, a attenuation of the signal having the angular frequency $\omega$ can be defined as follows:

$$-10 \cdot \log|\dot{H}(t)| = -10 \cdot \log\left|\frac{\dot{P}_{out}}{\dot{P}_{in}}\right| \text{ (dB)} \quad (7)$$

Generally, the signal attenuation given by the above equation (7) is a function of the angular frequency $\omega$ and is called the "baseband characteristic". That is, the baseband characteristic of the optical fiber is given by the following expression (8)

$$-10 \cdot \log\frac{|\dot{H}(t)_{\omega=\omega'}|}{|\dot{H}(t)_{\omega=0}|} \text{ (dB)} \quad (8)$$

This can be rewritten as $$-10 \cdot \log\left|\frac{\dot{P}_{out}}{\dot{P}_{in}}\right|_{\omega=\omega'} + 10 \cdot \log\left|\frac{\dot{P}_{out}}{\dot{P}_{in}}\right|_{\omega=0} \text{ (dB)} \quad (9)$$

where $\omega'$ denotes an arbitrary angular frequency, but $\omega' \neq 0$. The second term in the above expression represents the optical power loss.

According to the present invention, to suppress deterioration of linearity due to the wide variation in the optical power level at the O/E 23, an optical attenuator (ATT) 101 is introduced in the apparatus and a level adjustment, i.e., $|\dot{P}_{in}|_{\omega=0} = |\dot{P}_{out}|_{\omega=0}$, is achieved thereby in advance. Therefore, the value of the second term in the above expression (9) finally becomes zero.

Figure 3:
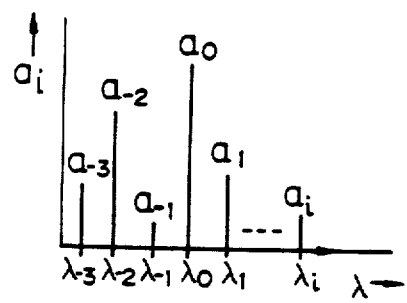
FIG. 3 is a graph of a light source emission spectrum distribution in terms of wavelength $\lambda$ and amplitude $a_i$.
Figure 4:
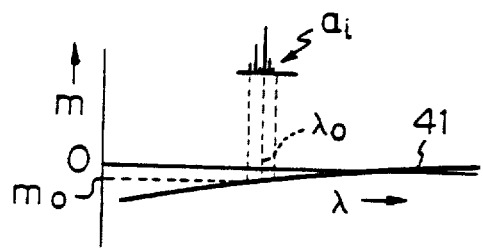
FIG. 4 is a graph of a chromatic dispersion characteristic in terms of wavelength $\lambda$ and chromatic dispersion characteristics.

The relationship between a light source spectrum and the baseband characteristic will be detailed below. The term "light source spectrum" is defined as an optical spectrum of the output light from the E/O 22 of FIG. 2. Considering here an optical emission spectrum distribution of the light source and the chromatic dispersion characteristic, these exhibit properties as shown in FIGS. 3 and 4. FIG. 3 is a graph of a light source emission spectrum distribution in terms of wavelength $\lambda$ and amplitude $a_i$. FIG. 4 is a graph of a chromatic dispersion characteristic in terms of wavelength $\lambda$ and the chromatic dispersion characteristic. The light source emission spectrum distribution is expressed by $a_i(\lambda_i)$, where $i = 0, \pm 1, \pm 2 \cdots$. The chromatic dispersion coefficient m is approximated to be a constant ($m_0$) in the range of the light source spectrum, because the expansion of the light source spectrum, in case of a laser diode (LD), is very narrow, e.g., several nm at most.

In FIG. 4, the solid line curve 41 exhibits an actually obtained characteristic. For $m = m_0$, the difference $t_i$ in the time delay between the arrival time of a signal consisting of wavelength $\lambda_0$ and an arrival time of a signal consisting of wavelength $\lambda$, both at the receiver side, is expressed as follows:

$$t_i = \int_{\lambda_0}^{\lambda_i} m \, d \times L \approx m_0 \times \Delta\lambda_i \times L \quad (10)$$

where $\Delta\lambda_i$ is represented by $\lambda_i - \lambda_0$. A signal having a spectrum intensity of the aforesaid $a_i$ is modulated by the sine wave signal produced from the oscillator 21 at the E/O 22 and transmitted along the optical fiber 14. Then, the transmitted signal reaches the O/E 23 as a received optical signal $\dot{A}$. The signal $\dot{A}$ can be expressed as follows by using the aforesaid angular frequency $\omega (= 2\pi f)$:

$$\dot{A} \exp(j\omega t) = \sum_i a_i \cdot \exp\{j\omega(t - t_i)\} \quad (11)$$

where $t_i$ denotes a delay time of the signal in the i-th spectrum mode. From the above equation (11), $$\dot{A} = \sum_i a_i \cdot \exp(-j\omega t_i) \quad (12)$$

is obtained.

Figure 5:
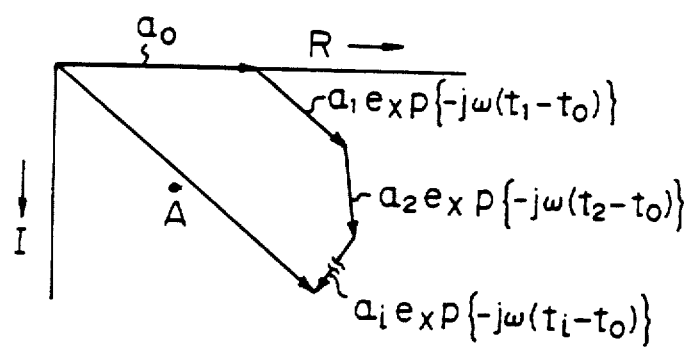
FIG. 5 is a vector diagram of a receiving optical signal $\mathring{A}$ expressed by using complex amplitude notation.

FIG. 5 is a vector diagram of a received optical signal $\dot{A}$ expressed by using complex amplitude notation. Each vector shown in FIG. 5 is expressed relative to a signal of wavelength $\lambda_0$ and amplitude $a_0$ as a reference vector. In FIG. 5, the abscissa R represents a real component and the ordinate I an imaginary component.

Accordingly, the baseband characteristic of the above recited expression (8) is then expressed as follows:

$$-10 \cdot \log\frac{|\dot{A}_{\omega=\omega'}|}{|\dot{A}_{\omega=0}|} = -10 \cdot \log\frac{\left|\sum_i a_i \cdot \exp\{-j\omega' t_i\}\right|}{\sum_i a_i} \quad (13)$$

This equation (13) provides a theoretically approximate function. On the other hand, the theoretical approxiate function can be expressed as the following equation (14) in relation to the selective level meter 24:

$$H(f) = -20 \cdot \log\left[\frac{\left|\sum_{i=1}^{n} a_i \cdot \exp(-j2\pi f \cdot m_0 \cdot \Delta\lambda_i \cdot L)\right|}{\sum_{i=1}^{n} a_i}\right] \text{ (dB)} \quad (14)$$

As seen from equation (14), the amplitude is taken into consideration as $a_i$ for every oscillation mode, therefore enabling a highly accurate measurement never before obtained.

In equation (14), the parameters $a_i$, f, $\Delta\lambda_i$, and L are all known values. The chromatic dispersion coefficient $m_0$ is unknown. Under these circumstances, on one hand, a measured baseband characteristic is obtained by plotting data produced from the selective level meter, while, on the other hand, a calculated baseband characteristic is obtained through computer simulation by inputting a variety of values for $m_0$ to equation (14) sequentially. Specifically, the calculated baseband characteristic can be obtained with the use of a processor 25 shown in FIG. 2. Next, a search is run for the calculated baseband characteristic with a profile most suited to a profile of the measured baseband characteristic. Then, a chromatic dispersion coefficient M to be finally obtained is derived from m, which specifies the thus searched calculated baseband characteristic.

Figure 6A:
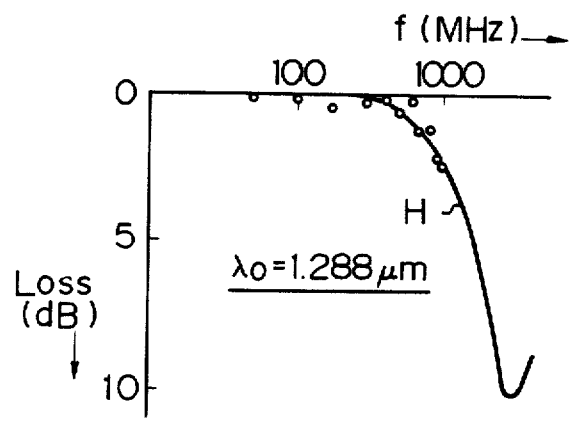
FIG. 6A is a graph of a first example of both the measured baseband characteristic and the calculated baseband characteristic.
Figure 6B:
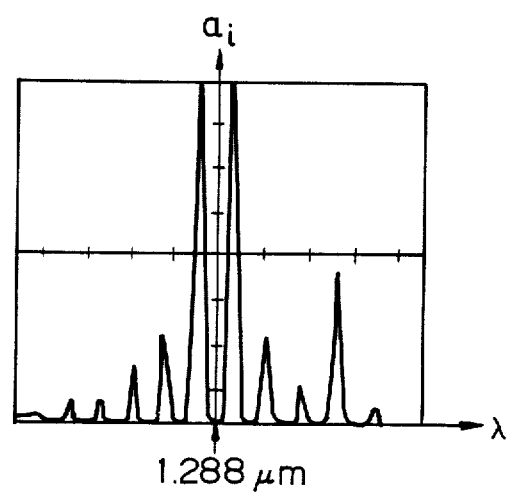
FIG. 6B depicts the distribution of a light source spectrum which is used for obtaining the graph shown in FIG. 6A.
Figure 7A:
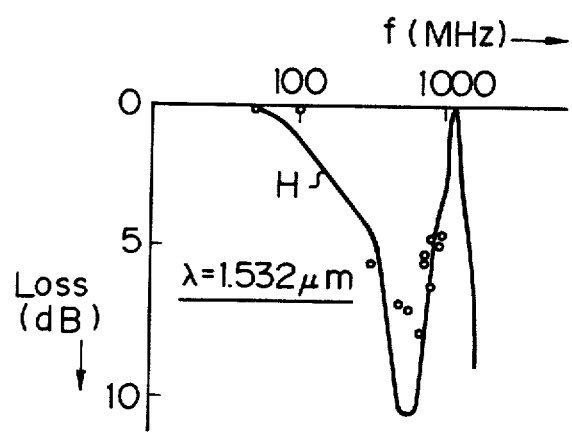
FIG. 7A is a graph of a second example of both the measured baseband characteristic and the calculated baseband characteristic.
Figure 7B:
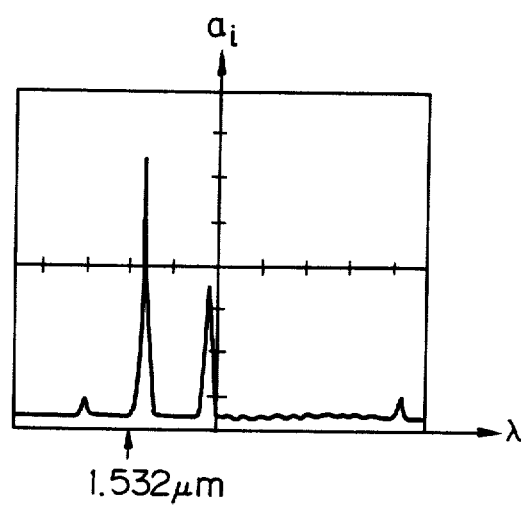
FIG. 7B depicts the distribution of a light source spectrum which is used for obtaining the graph shown in FIG. 7A.

FIG. 6A is a graph of a first example of the measured baseband characteristic and calculated baseband characteristic. FIG. 6B depicts the distribution of a light source spectrum used for obtaining the graph shown in FIG. 6A. Similarly, FIG. 7A is a graph of a second example of the measured baseband characteristic and calculated baseband characteristic. FIG. 7B depicts the distribution of a light source spectrum which is used for obtaining the graph shown in FIG. 7A.

In FIG. 6A (same for FIG. 7A), the abscissa represents a modulation frequency f (MHz) in logarithmic terms, and the ordinate an attenuation loss (Loss) in dB. The readings of the ordinate correspond to the readings of the selective level meter 24 shown in FIG. 2. In the graph, each small circle (o) indicates the measured data. A curve H represents a curve calculated in accordance with the above recited equation (14) while varying the value $m_0$ and corresponds to the curve which most closely approximates to the measured data. Accordingly, the value $m_0$, which simulates the curve H, becomes the chromatic dispersion coefficient M to be finally obtained.

In FIG. 6B (same for FIG. 7B), the ordinate represents the amplitude $a_i$ and the abscissa the wavelength $\lambda$. Regarding the wavelength, each graduation defines 1 nm. Therefore, the $\Delta\lambda_i$ in FIG. 6B equals about $0.73 \times (i-1)$ nm and, in FIG. 7B, about $1.43 \times (i-1)$ nm.

Computer simulation is most effective for searching for a desired curve H having a profile closest to a profile defined by the measured data displayed in FIGS. 6A and 7A. Concretely speaking, the closest curve can be found by, for example, a least squares approximation method. That is, a certain value m is searched for which will make the value of an appreciation function AF be a minimum. The appreciation function AF is defined as follows:

$$AF = \sum_{k=1}^{N} (F_k - H(f_k))^2 \quad (15)$$

where $F_k$ denotes the baseband value (corresponding to the value of Loss in FIGS. 6A and 7A) measured at the modulation frequency $f_k$, N is the number of measuring points, and $H(f_k)$ denotes the calculated value at that frequency $f_k$, according to the theoretically approximated function according to equation (14). Incidentally, it should be understood that no expensive measuring unit is needed, because the frequency $f_k$ is about 1000 MHz (1.GHz) at most.

Figure 8:
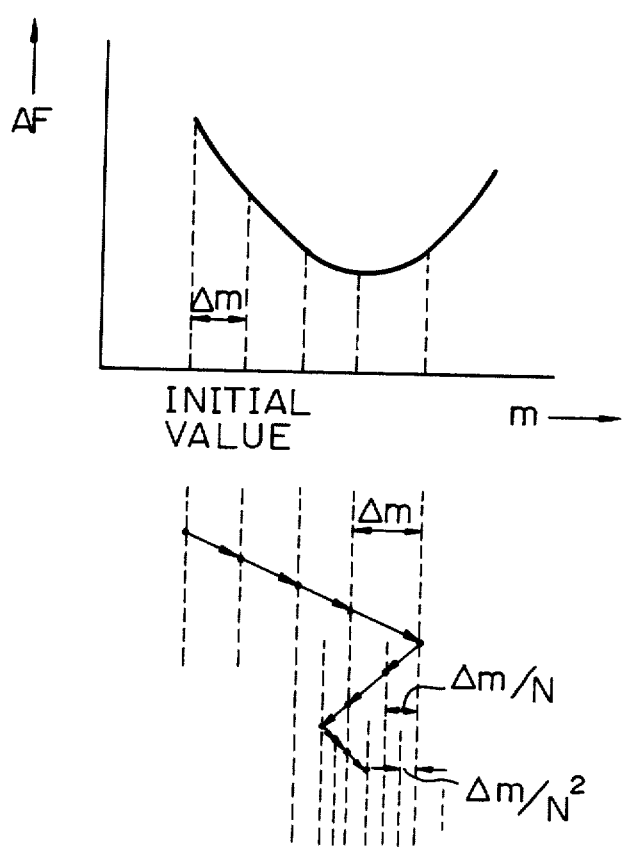
FIG. 8 is a graph for schematically explaining a calculation algorithm of a least squares approximation procedure.

FIG. 8 is a graph for schematically explaining the calculation algorithm of a least squares approximation procedure. In FIG. 8, the abscissa represents the chromatic dispersion coefficient m, while the ordinate represents the value of the appreciation function AF given by equation (15). The unit amount for varying the chromatic dispersion coefficient is indicated as $\Delta m$. The procedure in FIG. 8 is basically as follows.

(1) If the value of AF under the present value of m is smaller than the value of AF under the preceding value of m, the related calculation is continued under the following value of m; $m \rightarrow m + \Delta m$.

(2) If the value of AF under the present value of m is larger than the value of AF under the preceding value of m, the related calculation is continued under the following value of m; $m \rightarrow m - \Delta m'$, where $\Delta m'$ is reduced to $\Delta m/N$, where N is an arbitrary coefficient preferably selected to be a value on the order of 2 through 10.

(3) If $\Delta m/m < 10^{-3}$ is obtained, it is considered that the related calculation has converged.

Figure 9:
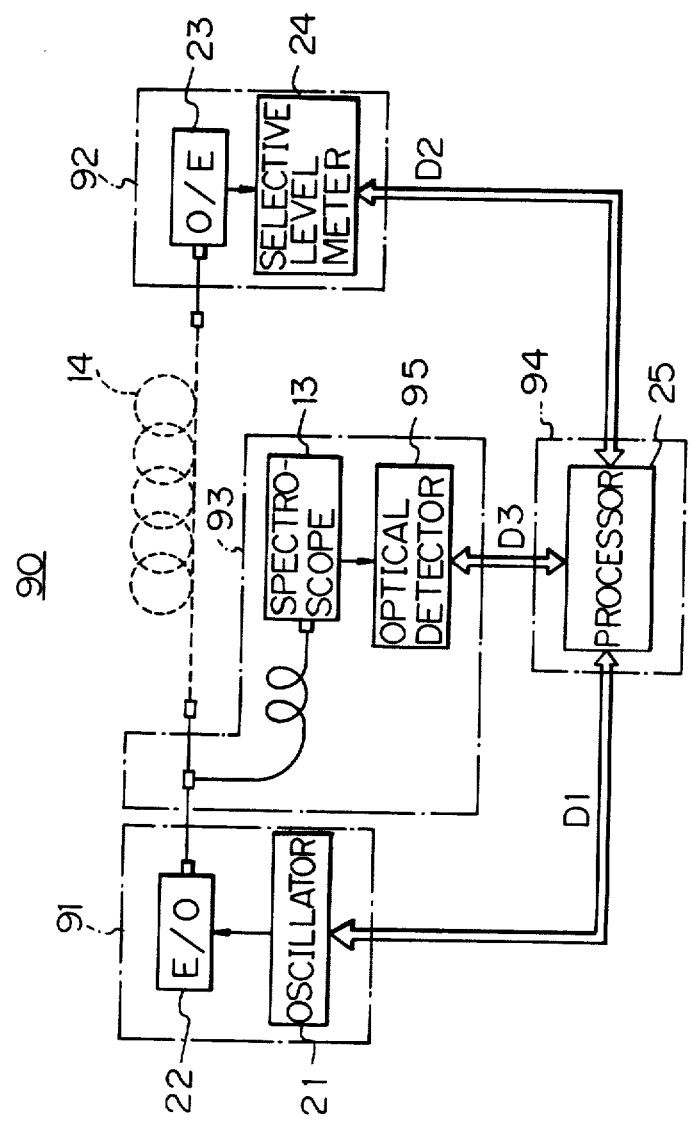
FIG. 9 is a general block diagram of a practical apparatus for measuring the chromatic dispersion coefficient according to the present invention.

FIG. 9 is a general block diagram of a practical apparatus for measuring the chromatic dispersion coefficient according to the present invention. The construction of FIG. 2 can actually, as well as practically, be built as shown by FIG. 9. In FIG. 9, an apparatus 90 for measuring the chromatic dispersion coefficient is classified into four parts 91, 92, 93, and 94. The first part 91 is an optical transmitter in which an amplitude-modulation optical signal modulated by an AC signal of frequency f is generated. The amplitude-modulation optical signal is provided to one end of the optical fiber 14 whose chromatic dispersion coefficient M is to be measured. The second part 92 is an optical receiver for detecting the baseband characteristic of an optical signal radiated from the other end of the optical fiber 14. The third part 93 is an optical spectrum analyzing part in which spectral decomposition is performed with respect to the optical signal supplied from the optical transmitter 91 and the analysis of an optical spectrum is made for the spectrally decomposed optical signal. The fourth part 94 is a data processing part for calculating the chromatic dispersion coefficient M in cooperation with the optical transmitter 91, the optical receiver 92, and the optical spectrum analyzing part 93.

As seen from FIG. 9, the optical transmitter 91 contains therein the oscillator 21 and the electro-optic converter (E/O) 22 driven by the oscillator 21, which generates the AC signal of variable frequency f, the value of which is used as a first data D1. The optical receiver 92 contains therein the opto-electric converter (O/E) 23 for transducing the received optical signal into an electric signal and the selective level meter 24 which is connected to the opto-electric converter (O/E) 23 and detects, from the electric signal, an amplitude level at each frequency f, the value of which amplitude is used as a second data D2. The optical spectrum analyzing part 93 contains therein the spectroscope 13 for achieving spectral decomposition with respect to the optical signal produced from the optical transmitter 91 and an optical detector 95 which interlocks with the spectroscope 13 to detect both the wavelength and the amplitude, at each oscillation mode, which are used as a third data D3. The data processing part 94 receives the first, second, and third data D1, D2, and D3 and executes an arithmetic operation therewith so as to calculate the chromatic dispersion coefficient M. The above-mentioned spectroscope 13 functions to extract an optical output, at each oscillation mode, corresponding to $\lambda_{-2}$, $\lambda_{-1}, \lambda_0$ - - - in FIG. 3 or to each line spectrum shown in FIGS. 6B and 7B. The above-mentioned optical detector 95 functions to detect, at each oscillation mode, the wavelength ($\lambda_i$) and the amplitude level ($a_i$). Further, the above-mentioned data processing part 94 contains therein the processor 25 (also shown in FIG. 2), a console for control, printers (both not shown), and so on.

Figure 10:
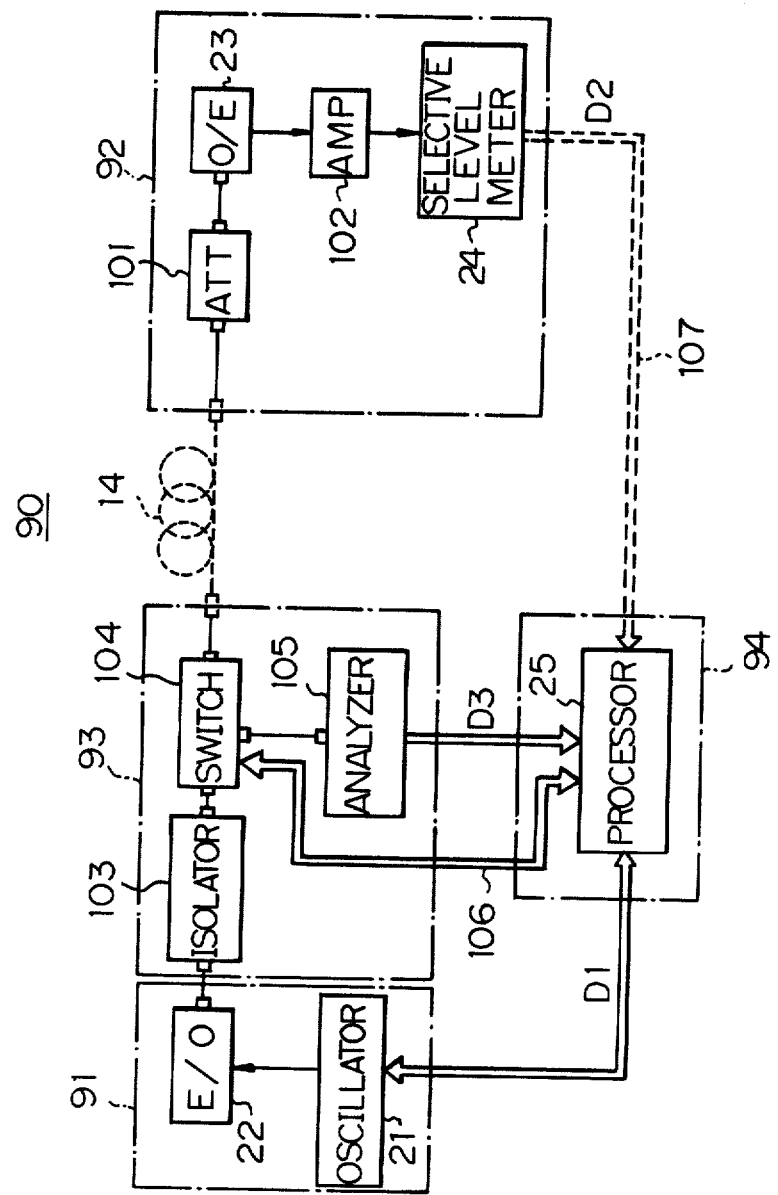
FIG. 10 is a general block diagram of an actually built apparatus based on the apparatus shown in FIG. 9.

FIG. 10 is a general block diagram of an actually built apparatus based on the apparatus 90 shown in FIG. 9. In the optical transmitter 91, the oscillator 21 is a product of Ando Electric Co., Ltd., referenced as GET-42P, and the electro-optic converter 22 is an improved version of a product of Ando Electric Co., Ltd., referenced as AQ-1309. In the optical receiver 92, the optical attenuator (ATT) 101 is a product of Fujitsu Ltd., referenced as H72M-2016-M001 (variable optical attenuator), an amplifier (AMP) 102 is a product of B & H Ltd., referenced as AC-3002H, and the selective level meter 24 is a product of Ando Co., Ltd., referenced as SLM-42 SP. In the optical spectrum analyzing part 93, both the spectroscope 13 and the optical detector 95 shown in FIG. 9 are formed, as an integral structure, with a product of Ando Electric Co., Ltd., referenced as FSM-01 (No. 105), i.e., an optical spectrum analyzer. Both the optical isolator 103 and the optical switch 104 are formed, as an integral structure, with a product of Fujitsu Ltd., referenced as H74M-5208-J003, i.e., a magneto-optic application switch. In the data processing part 94, the processor 25 is a product of Epson Ltd., referenced as HC-20.

In FIG. 10, as briefly mentioned earlier, the optical attenuator 101 is used in that, before starting the measurement, it is necessary to determine the frequency characteristic of the measuring apparatus 90 itself so as to compensate, in advance, for the data produced from the selective level meter 24 itself, i.e., to calibrate the apparatus. For this, first the optical transmitter 91 and the optical receiver 92 are optically shorted with each other, while the optical fiber 14 to be measured is left as it is. In this case, a considerably strong optical signal is input to the O/E transducer 23, because the fiber 14 is not yet connected thereto. Therefore, during the calibration, the received optical signal at the O/E transducer 23 must be reduced in optical strength to some degree, because an O/E transducer does not usually exhibit the same linearity for both a strong optical signal and weak optical signal.

On the other hand, in the optical transmitter 91, the optical isolator 103 is needed and inserted between the E/O 22 and an optical switch 104. If the semiconductor laser in the E/O transducer 22 were to receive a reflected optical signal from a load, chiefly comprised of the optical fiber 14, some change in the light source spectrum would be induced. Accordingly, this must be prevented by inserting the optical isolator 103 therebetween. The optical switch 104 is turned on or off in accordance with a path switch control command supplied, via a line 106, from the data processing part 94. During the measurement, when the optical switch 104 is switched to connect with the optical spectrum analyzer 105, the third data D3 is given to the processing part 94. The second data D2 is also transferred, via a line 107, to the processing part 94. The line 107 can be a direct coupling line if the optical receiver 92 is located near the processing part 94. The processing part 94 is preferably located close to both the optical transmitter 91 and the optical spectrum analyzing part 93. Alternatively, if the optical receiver 92 is located far from the processing part 94, the line 107 may be substituted with a public telephone line, so that an operator transmits the data D2 orally or by facsimile.

Figure 11A:
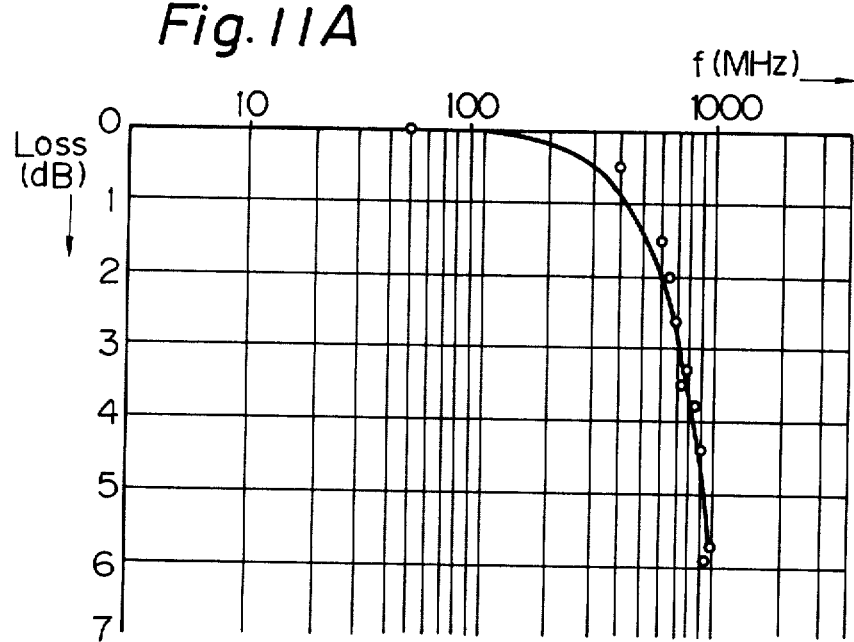
FIG. 11A is a graph of a third example of both the measured baseband characteristic and the calculated baseband characteristic.
Figure 11B:
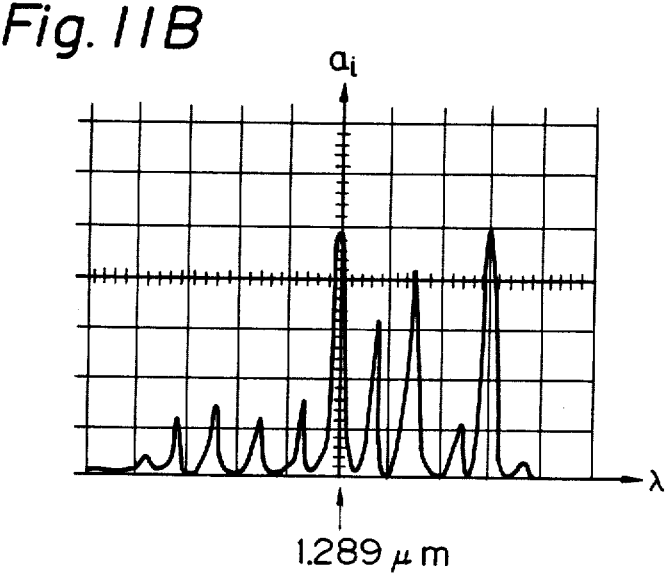
FIG. 11B depicts the distribution of a light source spectrum which is used for obtaining the graph shown in FIG. 11A.

FIG. 11A is a graph displaying a third example of both a measured baseband characteristic and calculated baseband characteristic. FIG. 11B depicts a distribution of a light source spectrum which is used for obtaining the graph shown in FIG. 11A. The data was measured not by a prototype measuring apparatus, but by an actual measuring apparatus having the arrangement shown in FIG. 10. The optical fiber 14 measured was an unprecedentedly long 48 km and the measuring frequency was several MHz. Thus, the data obtained was substantially the same as that of a commercial fiber optical communication system. The chromatic dispersion coefficient M to be obtained was derived as 2.1, i.e. $M=2.1$ ps/km/nm, from the data of FIGS. 11A and 11B. In FIG. 11A, the small circles (o) represent the measured baseband characteristic, while the solid line curve represents the calculated baseband characteristic.

Figure 12:
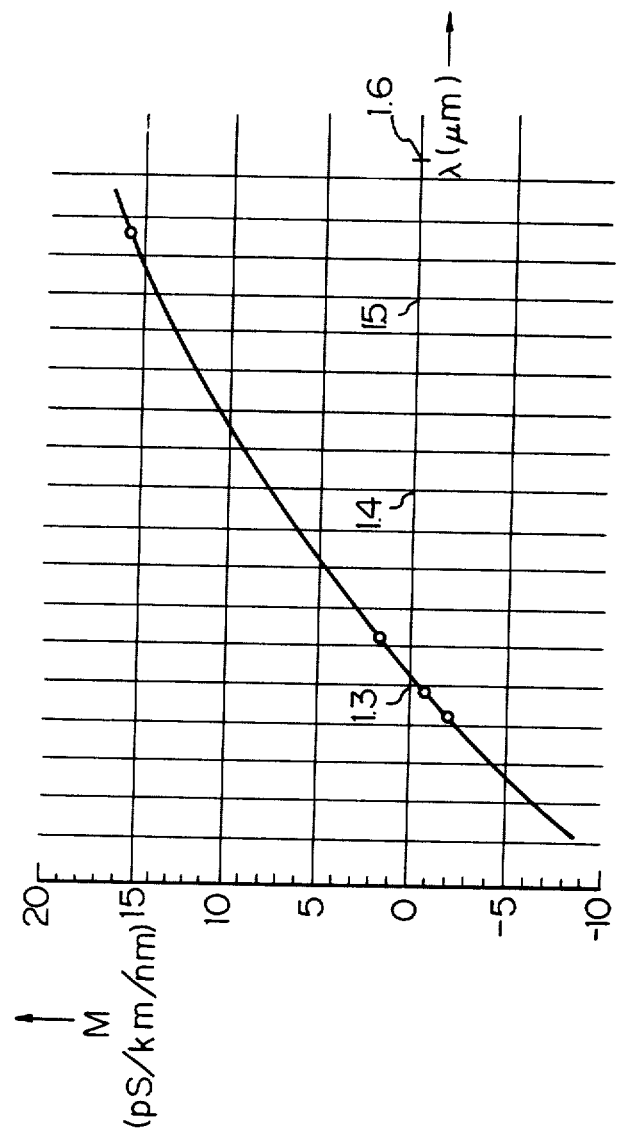
FIG. 12 is a graph of an example representing the actual relationship between the chromatic dispersion coefficient M and the wavelength $\lambda$.

FIG. 12 is a graph of an example representing the actual relationship between the chromatic dispersion coefficient M and the wavelength $\lambda$. The data of FIG. 12 was obtained from an optical fiber having a length of 35 km, a core diameter of 8 $\mu$m, a differential specific refraction index of 0.3%, and a cut-off wavelength of 1.28 $\mu$m. Although only four data points are plotted (small circles) in the graph of FIG. 12, the solid line curve is believed to accurately reflect the chromatic dispersion coefficient throughout the range of the wavelength.

Figure 13B:
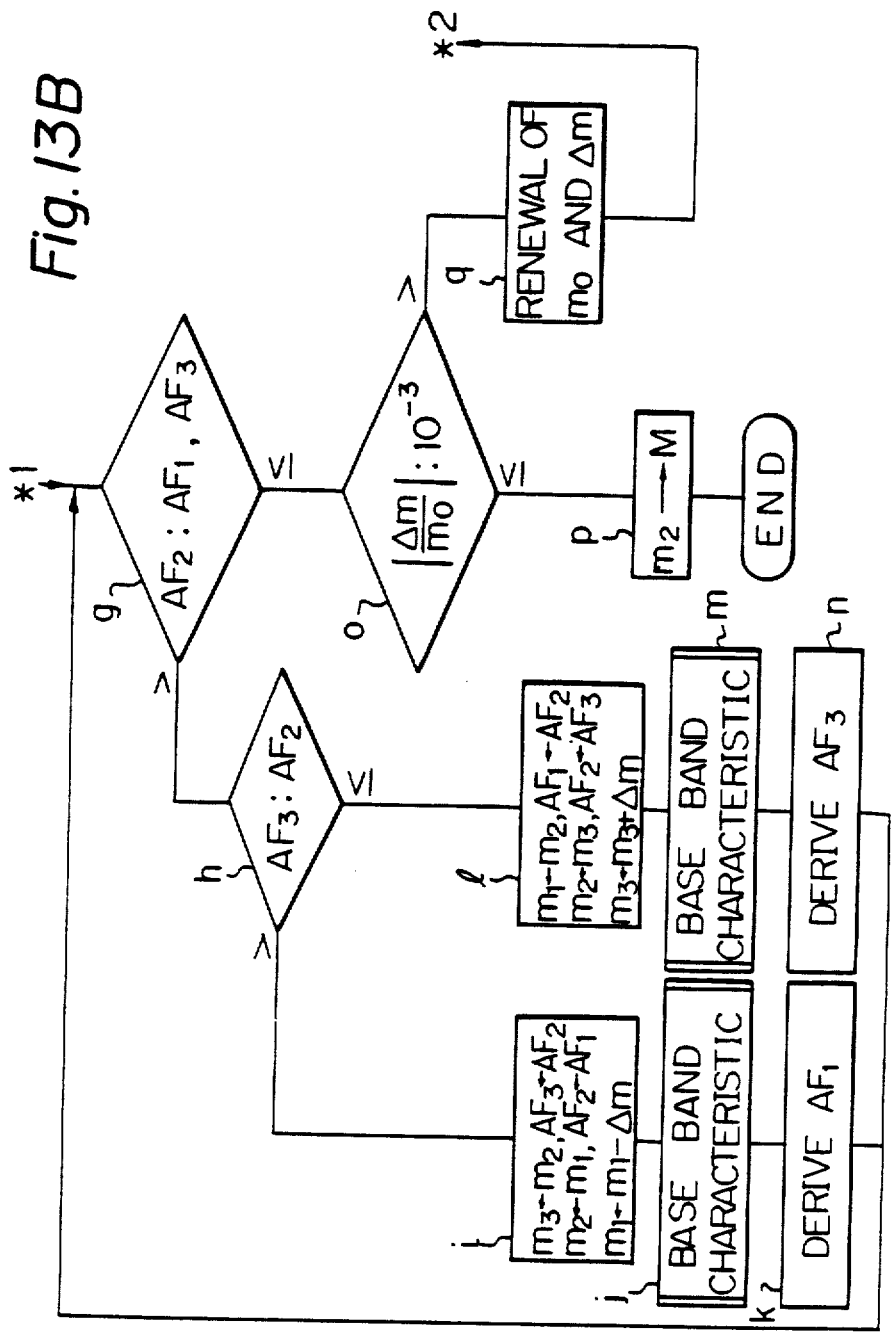

FIGS. 13A and 13B show a flow chart of the operation achieved in the chromatic dispersion coefficient measuring apparatus 90 shown in FIG. 10. At step a, the optical spectrum analysis is achieved at the optical spectrum analyzing part 93, based on the previously recited equation (14) so that the desired third data D3 is obtained, that is, $a_i$, and $\Delta \lambda_i$ are detected. At step b, the actual baseband characteristic is measured so as to obtain the desired second data D2, i.e., $f_k$ and $F_k$ defined by the previously recited equation (15). At step c, the unknown number $m_0$ is initially determined, which $m_0$ is defined by the previously recited equation (14). Thereafter, the unknown number $m_0$ is varied and $m_1$, $m_2$, and $m_3$ are sequentially selected so as to determine the calculated baseband characteristic (refer to the solid line curve in FIG. 11A) having the profile which fits closest to the measured actual baseband characteristic. Then, the number $m_2$ which specifies the thusly determined baseband characteristic is determined to obtain the desired chromatic dispersion coefficient M, i.e., $m_2 \rightarrow M$ (refer to step p in FIG. 13B). It should be understood, however, that the procedure for searching for M from $m_1$, $m_2$, and $m_3$ is not limited to the manner as mentioned above with reference to the figures. For example, the calculated baseband characteristic closest to the actual baseband characteristic can also be obtained through selection from a plurality of calculated baseband characteristics determined corresponding to various provisional chromatic dispersion coefficients.

At step d, $m_1$, $m_2$, and $m_3$ are defined to be $m_1 = m_0 - \Delta m$, $m_2 = m_0$, and $m_3 = m_0 + \Delta m$, where $\Delta m$ corresponds to that shown in FIG. 8. At step e, the calculated baseband characteristic is created by the data processing part 94. The calculation is performed, according to equation (14), by substituting $m_0$ with $m_1$, $m_2$, and $m_3$ sequentially. Thereby, in step f, the appreciation functions $AF_1$, $AF_2$ and $AF_3$ are derived with respect to $m_1$, $m_2$, and $m_3$, respectively.

Thereafter, in accordance with the relative sizes of $AF_1$, $AF_2$, and $AF_3$ (refer to steps g and h in FIG. 13B), the values of m, $AF_3$ and $AF_2$ are changed and a new value of $AF_1$ is derived (refer to steps i, j, and k), or similarly a new value is derived for $AF_3$ (refer to steps l, m, and n). Step 0 starts when $AF_2 \leq AF_1$, $AF_3$ is obtained, wherein if the accuracy is not sufficient, i.e. $|\Delta m/m| > 10^{-3}$ is obtained, then, in step q, $m_0$ and $\Delta m$ are renewed. Then, the operation returns to step d in FIG. 13A. In step q, $m_0$ is determined by $-(b/2a)$ and $\Delta m$ is shifted in value by $\Delta m/10$. The parameters a and bo of the term $-(b/2a)$ are identical to the coefficients a and b used in a second order curve, i.e., $am^2+bm+c$, which corresponds to the solid line curve shown in FIG. 8. The coefficient c is not used here for the related calculation.

The coefficients a and b are given by the following equations (16) and (17), respectively, pursuant to equation (15):

$$a = \frac{1}{m_2 - m_3}\left(\frac{AF_1 - AF_2}{m_1 - m_2} - \frac{AF_1 - AF_3}{m_1 - m_3}\right) \quad (16)$$

$$b = \frac{AF_1 - AF_2}{m_1 - m_2} - a(m_1 + m_2) \quad (17)$$

If $|\Delta m/m| \leq 10^{-3}$ is obtained at step o, the value of M is finally fixed to $m_2$ at step p.

As explained above in detail, in the present invention, first, the calculated baseband characteristic is obtained by means of the data processing part with data concerning the optical signal to be provided to the optical fiber. Second, the actual baseband characteristic is obtained through the measurement of the received optical signal at the optical receiver. Third, the chromatic dispersion coefficient is determined from both the calculated and actual baseband characteristics. The above measurement is clearly different from the prior art measurement in which differences in arrival times among optical signals of different wavelengths are detected. Thus, the present invention can eliminate the troublesome operation to assure synchronization between the optical transmitter and the optical receiver. In addition, the present invention can measure an actually laid optical fiber.

Furthermore, in other prior art above, two light sources having different wavelengths are used. The difference in arrival times between two optical signals therefrom is obtained by measuring the differences in phase therebetween. In the present invention, only one light source, such as a semiconductor laser, is enough to obtain the chromatic dispersion coefficient M. Thus, in view of the above, the present invention can be put into practical use easily and at a low cost.

We claim:

1. A method for measuring a chromatic dispersion coefficient comprising the steps of:
   (a) measuring an actual baseband characteristic of an optical fiber in accordance with a received optical signal level at an output end of the optical fiber, wherein the received optical signal corresponds to an input optical signal, having components of respective amplitudes in its optical spectrum corresponding to a plurality of oscillation modes, that is provided to an input end of the optical fiber, the input optical signal being modulated in amplitude with an AC signal which is varied to provide a plurality of modulation frequencies;
   (b) obtaining a calculated baseband characteristic having a profile fitting closest to the actual baseband characteristic, by using data concerning the wavelengths and amplitudes of said components corresponding to said oscillation modes in the optical spectrum of the input optical signal, data concerning the modulation frequencies, and data concerning a provisional chromatic dispersion coefficient; and
   (c) determining the provisional chromatic dispersion coefficient providing said closest fitting profile as the actual chromatic dispersion coefficient of the optical fiber.

2. A method as set forth in claim 1, wherein, in step (b), the calculated baseband characteristic fitting closest to the measured actual baseband characteristic is obtained through a comparison of said actual and calculated baseband characteristics while sequentially varying the value of the provisional chromatic dispersion coefficient.

3. A method as set forth in claim 1, wherein, in step (b), the calculated baseband characteristic fitting closest to the actual baseband characteristic is obtained through selection from a plurality of calculated baseband characteristics each having a corresponding provisional chromatic dispersion coefficient.

4. A method as set forth in claim 2, wherein the calculated baseband characteristic is defined by approximation function $$H(f) = -20 \cdot \log\left[\frac{\left|\sum_{i=1}^{n} a_i \exp(-j2\pi f \cdot m_0 \cdot \Delta\lambda_i \cdot L)\right|}{\sum_{i=1}^{n} a_i}\right] \quad (dB)$$

where $a_i$ is the amplitude of the component corresponding to the i-th oscillation mode of said input optical signal, f is the respective modulation frequency, $\Delta\lambda_i$ is the difference between the wavelengths of the components corresponding to the i-th oscillation mode and a first of said oscillation modes, $m_o$ is said provisional chromatic dispersion coefficient, and L is the length of the optical fiber to be measured.

5. A method as set forth in claim 3, wherein the calculated baseband characteristic is defined by $$H(f) = -20\log\left[\frac{\left|\sum_{i=1}^{n} a_i \exp(-j2\pi f \cdot m_0 \cdot \Delta\lambda_i \cdot L)\right|}{\sum_{i=1}^{n} a_i}\right] \quad (dB)$$

wherein there are n of said components corresponding to said oscillation modes of said input optical signal, $a_i$ is the amplitude of the component corresponding to the i-th oscillation mode of said input optical signal, f is the respective modulation frequency, $\Delta\lambda_i$ is the difference between the wavelengths of the components corresponding to the i-th oscillation mode a first of said oscillation modes, $m_o$ is said provisional chromatic dispersion coefficient, and L is the length of the optical fiber to be measured.

6. A method as set forth in claim 4, wherein the chromatic dispersion coefficient is derived through computer simulation with the aid of a processor, the processor collecting and storing therein at least two data sets, in advance, the first of said data sets specifying said function H(f), and the second of said data sets specifying the actual baseband characteristic measured.

7. A method as set forth in claim 5, wherein the chromatic dispersion coefficient is derived through computer simulation with the aid of a processor, the processor collecting and storing therein at least two data sets, in advance, the first of said data sets specifying said H(f), and the second of said data sets specifying the actual baseband characteristic measured.

8. A method as set forth in claim 6, wherein said computer simulation is performed under a least squares approximation method by employing an appreciation function $$AF = \sum_{k=1}^{N} (F_k - H(f_k))^2$$

where $F_k$ denotes the value of the actual baseband characteristic measured at the respective modulation frequency $f_k$, and N a selected number of measuring points.

9. A method as set forth in claim 7, wherein said computer simulation is performed under a least squares approximation method by employing an appreciation function $$AF = \sum_{k=1}^{N} (F_k - H(f_k))^2$$

wherein $F_k$ denotes the value of the actual baseband characteristic measured at the respective modulation frequency $f_k$, and N a selected number of measuring points.

10. A method for measuring a chromatic dispersion coefficient comprising the steps of:
(a) projecting an input optical signal, having a plurality of components in its optical spectrum corresponding to a plurality of oscillation modes, onto one end of an optical fiber, the input optical signal being modulated by an AC signal which is varied to provide a plurality of modulation frequencies;
(b) measuring an actual baseband characteristic through detection, by means of an optical receiver, of an output optical signal received at another end of the optical fiber corresponding to said input optical signal at each said modulation frequency;
(c) detecting the wavelength and amplitude of each said component corresponding to each said oscillation mode of the input optical signal with the aid of an optical spectrum analyzing part;
(d) deriving a calculated baseband characteristic fitting closest to the measured baseband characteristic, by using data concerning the modulation frequency, the wavelength and the amplitudes detected by the optical spectrum analyzer, and a provisional chromatic dispersion coefficient; and
(e) determining the provisional chromatic dispersion coefficient providing said closest fitting of said actual and calculated baseband characteristics to be the actual chromatic dispersion coefficient of the optical fiber.

11. An apparatus for measuring a chromatic dispersion coefficient comprising:
means for measuring an actual baseband characteristic of an optical fiber in accordance with the level of an output optical signal received at an output end of the optical fiber, the output optical signal corresponding to an input optical signal having a plurality of components corresponding to respective oscillation modes in its power spectrum and which is provided to an input end of the optical fiber, the input optical signal being modulated in amplitude with an AC signal which is varied to provide a plurality of modulation frequencies; and
means for obtaining a calculated baseband characteristic having a profile fitting closest to the measured actual baseband characteristic, by using data concerning the wavelengths and amplitudes of each of said components corresponding to said oscillation modes of the input optical signal, data concerning the modulation frequencies, and data concerning a provisional chromatic dispersion coefficient;
wherein the value of the provisional chromatic dispersion coefficient providing said closest fitting profile is determined to be the actual chromatic dispersion coefficient of the optical fiber.

12. An apparatus as set forth in claim 11, wherein the two means comprise:
an optical transmitter operative to modulate an optical signal with said AC signal to provide said input optical signal;
an optical receiver for detecting said level of the output optical signal at each of the modulation frequencies for the measuring of said actual baseband characteristic of the optical fiber;
an optic spectrum analyzing part for detecting the wavelengths and amplitudes of said components corresponding to said oscillation modes of the input optical signal; and
a data processing part for computing said calculated baseband characteristic by using said data concerning the modulation frequency, the wavelength, and the amplitude produced from the optic spectrum analyzer, and a provisional chromatic dispersion coefficient and to set the provisional chromatic dispersion coefficient corresponding to the calculated baseband characteristic as the actual chromatic dispersion coefficient of the optical fiber.

13. An apparatus as set forth in claim 12, wherein said optical transmitter contains therein both an oscillator for producing the variable frequency AC signal and an electro-optic converter driven by said AC signal from the oscillator for providing said input optical signal.

14. An apparatus as set forth in claim 13, wherein said electro-optic converter is provided with an optical isolator to prevent feedback of its output as an input.

15. An apparatus as set forth in claim 14, wherein an optical switch is located between said optical isolator and said input end of the optical fiber, said optical spectrum analyzing part comprises a spectroscope, and the optical switch is operative to selectively supply the input optical signal to said spectroscope and to said input end of the optical fiber.

16. An apparatus as set forth in claim 12, wherein said optical receiver comprises an opto-electric converter for transducing the output optical signal from the output end of the optical fiber to a corresponding electric signal, and a selective level meter which is supplied with said electric signal so as to detect the level of the output optical signal at each said modulation frequency.

17. An apparatus as set forth in claim 16, wherein said opto-electric converter is provided at its input, with an optical attenuator for attenuating said output optical signal.

18. An apparatus as set forth in claim 12, wherein said optical analyzing part comprises a spectroscope to perform spectral decomposition of said input optical signal and an optical detector for detecting both the wavelength and amplitude of each said component corresponding to each said oscillation mode.

19. An apparatus as set forth in claim 18, comprising an optical spectrum analyzer which includes said spectroscope and said optical detector as an integral structure.

* * * * *

UNITED STATES PATENT AND TRADEMARK OFFICE
CERTIFICATE OF CORRECTION

PATENT NO. : 4,710,022
DATED : Dec. 1, 1987
INVENTOR(S) : Soeda et al.

It is certified that error appears in the above-identified patent and that said Letters Patent is hereby corrected as shown below:

Col. 2, line 15, "$a_1$" s/b --$a_i$--.
Col. 3, line 39, "time" s/b --site--.
Col. 5, line 56, "($_1$)" s/b --($_i$--;
line 65, delete "con-";
line 66, "sisting of wavelength" s/b --wavelength of--.
line 67, "consisting of wavelength" s/b --wavelength of--
Col. 6, line 43, "approxiate" s/b --approximate--.
Col. 7, line 24, delete "to".
Col. 12, line 47, "wherein" s/b --where--.
Col. 14, line 59, after "optical" insert --spectrum--.

Signed and Sealed this

Seventh Day of June, 1988

Attest:

DONALD J. QUIGG

Attesting Officer

Commissioner of Patents and Trademarks